United States Patent
Nesbitt

[15] 3,671,477
[45] June 20, 1972

[54] COMPOSITION COMPRISING UNSATURATED ELASTOMER, EPOXY RESIN POLYCARBOXYLIC ACID OR ANHYDRIDE, CROSS-LINKING CATALYST AND FILLER AND GOLF BALL MADE THEREFROM

[72] Inventor: Robert Dennis Nesbitt, Don Mills, Ontario, Canada

[73] Assignee: Campbell Manufacturing Company Limited, Montreal, Quebec, Canada

[22] Filed: Dec. 16, 1970

[21] Appl. No.: 98,930

Related U.S. Application Data

[63] Continuation-in-part of Ser. No. 833,794, June 16, 1969, abandoned.

[30] Foreign Application Priority Data

March 10, 1969 Canada....................................045,249

[52] U.S. Cl................260/23.5 A, 260/23.7 M, 260/41.5 R, 260/41.5 A, 260/47 EA, 260/78.4 D, 260/836, 260/837 R, 273/62, 273/218, 273/DIG. 3, 273/DIG. 10

[51] Int. Cl..................A63b 37/00, C08d 9/08, C08d 9/10
[58] Field of Search.............260/47 EA, 836, 837 R, 23.5 A, 260/23.7 M, 41.5 R, 41.5 A, 78.4 D; 273/62, 218

[56] References Cited

UNITED STATES PATENTS 3,553,159   1/1971   Miller et al. ...........................260/837

FOREIGN PATENTS OR APPLICATIONS 693,098   8/1964   Canada..................................260/837
920,802   3/1963   Great Britain.........................260/837
1,051,030   12/1966   Great Britain.........................260/837

Primary Examiner—Donald E. Czaja
Assistant Examiner—Donald J. Barrack
Attorney—Guy Drouin

[57] ABSTRACT

A composition of matter particularly suitable for the manufacture of unitary molded golf balls consists of a blend of an unsaturated elastomer capable of being crosslinked by peroxide-initiated polymerization, an epoxy resin, a curing agent comprising unsaturated polycarboxylic acid or unsaturated polycarboxylic acid anhydride, a crosslinking catalyst for the elastomer and a filler material.

14 Claims, No Drawings

COMPOSITION COMPRISING UNSATURATED ELASTOMER, EPOXY RESIN POLYCARBOXYLIC ACID OR ANHYDRIDE, CROSS-LINKING CATALYST AND FILLER AND GOLF BALL MADE THEREFROM

This application is a continuation-in-part of application, Ser. No. 833,794 filed on June 16, 1969 and now abandoned.

This invention relates to a novel composition of matter and is more particularly directed to an improved unitary molded golf ball made therefrom. The golf ball of the invention exhibits exceptional cut and impact resistance yet retains all of the desirable characteristics of the conventional rubber thread wound ball.

Prior art golf balls comprise, in general, two types. These are the wound ball, wherein a vulcanized rubber string is wound under tension about a solid or semi-solid core and thereafter enclosed in a sheath or covering of tough, protective material. The second known prior art golf ball consists of a solid mass of moldable resilient material which has been cured to develop the necessary degree of hardness to provide utility. Generally such molded balls require no enclosing cover. Both the wound ball and the molded ball must conform to standards of ball size, weight, roundness, initial velocity and "click" as set down in the rules of play by, for example, the United States Golf Association (U.S.G.A.).

While the wound ball has for many years satisfied both the standards of the U.S.G.A. and the requirements of most players of the game of golf, it has not been without disadvantages. The wound ball of good quality is difficult to manufacture due to the number of production steps required and the careful control which must be exercised in each stage of manufacture in order to achieve suitable roundness, velocity or rebound, "click" and the like. "Click" is the term applied to the sound produced by the ball when dropped on a hard surface or when struck with a golf club. As well, the cover material for the wound ball has not provided the optimum in adhesion to the wound core and is also frequently susceptible to cutting when struck by the club.

In an effort to overcome the shortcomings of the wound ball, the one-piece molded ball was developed. Such a ball generally comprises a combination of materials such as elastomers, fillers and curing agents which may be formed under high pressure and temperature to provide a ball of suitable hardness and resilience. Molded balls are described, for example, by J. R. Bartsch in U.S. Pat. No. 3,313,545, G. H. Brice in U.S. Pat. No. 3,373,123 and H. W. Brandt et al. in U.S. Pat. No. 3,384,612.

Whereas the production of molded balls has involved simplified manufacturing procedures and has resulted in reduced production costs, these balls have not proven completely successful in respect to cut resistance, water absorption and resilience.

It is, therefore, the primary object of this invention to provide a unitary molded golf ball of improved cut resistance, which ball complies with all the requirements of the rules of golf play. Additional objects of the invention will appear hereinafter.

The improved golf ball of the present invention comprises a molded blend of an elastomer capable of being crosslinked by peroxide-initiated polymerization, an epoxy resin, an epoxy resin curing agent or hardener comprising unsaturated polycarboxylic acids, unsaturated polycarboxylic acid anhydrides and mixtures thereof, a filler material, a crosslinking catalyst for said elastomer and, optionally, an epoxy resin curing accelerator.

The important discovery of the present invention which distinguishes the composition of matter from the prior art and which results in markedly improved cut and impact resistance in golf balls and other shaped objects made therefrom is the use as the epoxy resin curing agent or hardener of unsaturated polycarboxylic acids, unsaturated polycarboxylic acid anhydrides and mixtures thereof. The use of such hardener enables the elastomeric polymer component and the epoxy resin polymer component to bond together forming strong chemical bonds.

It is well known from the prior art that epoxy resins will react with other materials to form hard, resinous products. Some of these epoxy resin hardeners or curing agents include, for example, primary, secondary and tertiary amines and Lewis acids. It has now been found that if an epoxy resin curing agent is chosen which contains reactive unsaturation and this curing agent is employed in a mixture of epoxy resin and unsaturated elastomer capable of being crosslinked, the resulting curing reaction produces a multi-dimensional system having strong interlocking bonds. The hardened epoxy resin produces in a resultant golf ball made therefrom the desired hardness and "click" while the crosslinked elastomer contributes high resilience and rebound. Both systems are held together in a single matrix to provide a molded ball of extreme durability. However, if an epoxy resin curing agent is chosen which lacks reactive unsaturation, the resultant product, while having some of the characteristics of a conventional wound ball, will lack "click" and shows no improvement in cut or impact resistance due to the absence of chemical bonding between the epoxy system and the elastomer system.

The preferred elastomer capable of being crosslinked by peroxide initiation in the composition of the invention is cis-1,4-polybutadiene because of its very high resiliency and low hysteresis. Other elastomers which may be used, although these generally will be employed in lower grade or lower quality balls, include, for example, polyisoprene, ethylene/propylene/non-conjugated diolefin terpolymers, styrene/butadiene rubbers, acrylonitrile/butadiene copolymers and mixtures thereof.

As epoxy resin, it is preferred to use cyclo-aliphatic epoxy resins and particularly those cyclo-aliphatic epoxy resins which have low molecular weight because of ease of processing during manufacture and because high crosslinking density and fast cure rates may be obtained during their use. By low molecular weight is meant an epoxy resin having a viscosity of less than 1,000 cps. when measured at 25° C.

Examples of cyclo-aliphatic epoxy resins which have been found particularly suitable are those manufactured by Union Carbide Company and sold under the designations ERL–4289 and ERL–4221.

ERL–4289 has the structural formula

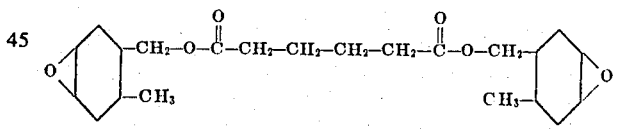

and is characterized in having a viscosity of 900 cps. at 25° C. and an equivalent weight of 220.

ERL–4221 which is most preferred for use in the composition of this invention is represented by the formula 3,4-epoxycyclohexylmethyl-3,4-epoxycyclohexanecarboxylate and is obtained by reacting, under mild conditions, 3-cyclohexenyl-methyl-3-cyclohexenecarboxylate with 2 moles of peracetic acid in solution. The carboxylate reactant is in turn obtained by the Tischenko condensation of tetrahydrobenzaldehyde. ERL–4221 is characterized by a viscosity of 400 cps. at 25° C. and an equivalent weight of 135.

Other suitable epoxy resins include for example, epoxy novolac resins and epichlorohydrin-4,4'-dihydroxydiphenyl-dimethylmethane type resins. The latter type resins are polymers produced by condensation of epichlorohydrin with 4,4'-dihydroxyphenyl-dimethylmethane. A resin of this type, which has been found particularly suitable is one having a molecular weight of about 380. Epoxy novolac resins are produced by condensing the hydroxyl group of a phenolic resin with epichlorohydrin. A suitable epoxy novolac resin is that having a viscosity of 14–20 poises at 52° C. and an equivalent weight of 172–179.

The epoxy novolac resins and epichlorohydrin-4,4'-dihydroxyphenyl-dimethylmethane type resins are, however, more suitable for use in applications other than golf balls due to the softer and more flexible product which results from their combination with an unsaturated rubber and an unsaturated polycarboxylic acid or anhydride. Curing time is longer than with a cyclo-aliphatic epoxy resin due to the slower reaction with rubber and curing agent.

Either high or low molecular weight resins may be employed depending on the product being made and the intended end use of that product. Generally, low molecular weight resins result in a harder and less flexible product than do the high molecular weight resins when compounded with elastomer using an equal volume of resin. Greater hardness may be obtained with the high molecular weight resins by increasing the proportion of resin in the formulation. Such an increase, however, reduces the elastomer content and lowers the resilience of the final product.

The epoxy resin curing agents as mentioned heretofore are unsaturated polycarboxylic acids and their anhydrides such as, for example, citraconic acid, itaconic acid, fumaric acid, maleic acid and maleic anhydride. These agents may be used singly or in admixture with each other.

The crosslinking catalyst is of the free radical or peroxide type such as, for example, 2,5-bis(tert-butyl peroxy)-2,5-dimethylhexane, di-tert.butyl peroxide, dicumyl peroxide, benzoyl peroxide and 2,4-dichlorobenzol peroxide.

Filler material used to control the weight of the molded ball without affecting ball resilience is preferably a precipitated hydrated silica such as that sold under the trade mark "HiSil" by the Pittsburg Plate Glass Company. Other suitable fillers include for example, clays, talc, asbestos, glass, carbonates such as calcium carbonate, magnesium carbonate, etc., metal oxides such as zinc oxide, iron oxide, aluminum oxide, magnesium oxide, etc., particulate synthetic plastics such as high molecular weight polyethylene, polystyrene, polyethylene ionomer resins, etc. and particulate carbonaceous materials such as carbon black, natural bitumen, etc.

Additionally, the composition may also contain various additives well known in the rubber and molding arts such as, for example, crosslinking promoters for the elastomer, antioxidants, mold release agents and the like.

Epoxy resin curing accelerators may be employed in small amounts to speed up the curing rate of the epoxy resin and so match the crosslinking rate of the elastomer component within the matrix. These epoxy curing accelerators may be any one of a number of well known commercial products adapted for this purpose and include, for example, stannous octoate, dimethylaminomethylphenol, tri(dimethylaminomethyl)phenol, Lewis acids such as boron trifluoride complexes, and the like.

The composition may also advantageously contain a white coloring pigment such as for example, titanium dioxide, the presence of which simplifies the surface painting operation of the finished ball. In some cases the use of coloring pigment will eliminate the need for painting altogether, such as, for example, where the ball is intended for use on driving ranges.

The preferred ranges of proportions of the ingredients used in the composition of the invention are shown below in Table I, the quantities shown being in parts by weight.

TABLE I

| | |
|---|---|
| Elastomer | 100 |
| Filler | 20–45 |
| Coloring Pigment (optional) | 0.5–10 |
| Epoxy Resin | 20–45 |
| Epoxy Resin Curing Agent | 5–20 |
| Epoxy Resin Curing Accelerator (optional) | 0.1–0.5 |
| Additives (antioxidants, mold release agents, etc.) (optional) | 0.5–5 |
| Crosslinking Catalyst | 0.5–5 |

Wide latitude may be taken in the production of balls from the ingredients shown in Table I in order to provide balls of various compressions suitable for every type of golfer yet complying with all the requirements of the standard ball as laid down in the rules of the game. For example, low compression balls are generally preferred by the "soft" hitters or lady golfers and may be made by increasing the proportion of the elastomer component or by employing an elastomer having a lower resilience. Medium compression balls, preferred by the average golfers, may be made by carefully balancing the quantity of the elastomer and epoxy resin component, while high compression balls preferred by the "hard" hitters may be made by increasing the proportion of the epoxy resin component. Additionally, balls of various compression may be produced by controlling the degree of cure during the manufacturing process.

The golf ball of this invention may be made by following the conventional mixing and compounding procedures used in the rubber industry. A typical mixing procedure consists of the following sequential steps.

a. The epoxy resin component and the filler material are blended together in a conventional mechanical mixer such as a Baker-Perkins mixer.

b. The blended epoxy resin and filler are added to the elastomer component and blended together either in a mechanical mixer or on a two-roll mill.

c. The remaining ingredients comprising the epoxy resin hardener, the crosslinking catalyst, the epoxy resin curing accelerator, additives such as the mold release agent and the like, and, if desired, the coloring pigment are added to the blended elastomer/epoxy resin/filler and the whole mixed until homogeneous.

d. The fully blended mix may then be divided into small proportions of desired size and shape preparatory to the molding step.

Molding of the ball is accomplished by placing the uncured, preformed portions or slugs between the two halves of a conventional press mold having dimpled golf ball cavities therein and applying sufficient pressure to close the two halves of the mold. The volume of the preformed portions placed in the mold cavities is slightly in excess of the actual volume of the ball cavities thus allowing the cavities to be completely filled when the mold is closed. An extrudate or flash of excess molding composition is formed at the mating surfaces of the two closed hemispherical cavities. The pressure applied to the mold is that which is required to close the mold completely during the cross-linking and curing process and is optimumly from about 800 to 900 p.s.i. for each ball molded.

The molding temperature will primarily depend upon the decomposition temperature of the crosslinking catalyst employed. The initial decomposition of the preferred peroxide crosslinker, 2,5-bis(tert-butyl peroxy)-2,5-dimethylhexane, is between 300° F. and 340° F. Where this material is employed, the minimum molding temperature will be 300° F. with the optimum temperature of about 310° F. High curing temperatures up to 400° F. or higher are possible but are not desirable since the cure rate is accelerated too quickly and the outside of the molded ball may become fully cured before the inside of the ball has reached curing temperatures, thus preventing a homogeneous crosslinked density throughout the ball. The curing time required with the preferred peroxide cross linker at a temperature of 310° F. is between about 10 and 15 minutes. Normally no advantages will be gained in the physical properties of the ball if curing is extended beyond 15 minutes.

After the elapsed curing period, the mold cavities are cooled while pressure is maintained on the mold platen. Slight shrinkage of the cured, molded ball occurs during cooling and permits easy removal of the cured ball from the mold. The mold cavity size is designed to account for this shrinkage and thus produce a ball having a minimum finished diameter of 1.680 inches as specified by the U.S.G.A. rules or, if desired, having a finished diameter of 1.62 inches for use in play under the rules of The Royal and Ancient Golf Club of St. Andrews.

After being taken from the mold, the cured ball is trimmed or buffed to remove any parting seam or flash which may be formed at the parting joint of the hemispherical mold cavities. The ball may then be painted and labeled using conventional equipment employed in the industry.

The following Table II shows three compositions prepared in accordance with the present invention and made up of the same constituents in different proportions so as to result in golf balls of 80, 90 and 100 compression respectively.

TABLE II

| Ingredients | Ball (parts by weight) | | |
|---|---|---|---|
| | 80-compression | 90-compression | 100-compression |
| Cis-1,4-polybutadiene | 100 | 100 | 100 |
| "HiSil" | 20 | 21 | 23 |
| Titanium dioxide | 1 | 1 | 1 |
| ERL-4221 | 35 | 40 | 45 |
| Fumaric acid | 18 | 19 | 20 |
| Polypropylene glycol M.W. 425 | 2 | 2 | 2 |
| 2.5-bis(tert.butyl peroxy)-2,5-dimethyl hexane (45% active) | 1.75 | 2.00 | 2.25 |

Table III demonstrates the improved cut and impact resistance of the golf balls of Table II while maintaining the weight, rebound and "click" properties of conventional wound balls.

The results shown in Table III are produced using two testing procedures commonly employed in the golf ball industry. The first of these is the "Guillotine Cut Test" wherein the ball to be tested is held firmly in a cavity which exposes the top half of the ball. A guillotine blade weighing 5 pounds and having inner and outer blade edge angles of 90° and 60° respectively and a cutting edge of three sixty-fourths inch radius is dropped from a height of 3.5 feet to strike the ball at a point one-half inch off the top center point. The guillotine blade is guided during the drop by means of a substantially friction-free vertical track. The drops are repeated until ball failure results, ball failure being defined as permanent damage evidenced by a crack or by removal of a segment from the ball surface. The second test procedure employed is the "Pneumatic Impact Test" wherein the ball is propelled by means of compressed air through a barrel having a length of 8 feet and against a slightly deflected steel plate. The bore of the barrel is 1.695 inches, slightly in excess of the U.S.G.A. standard maximum ball diameter. In the test, the ball is placed in the breech of the barrel to which is connected a 16 gallon air reservoir containing air at 15 p.s.i. Upon the opening of a 1½ inch quick-acting valve, the compressed air accelerates the ball through the barrel and against the steel plate placed a distance of 11 feet from the breech. The test is repeated until ball failure results, failure being defined as surface breakage, removal of a surface segment or permanent distortion of the ball from the round.

TABLE III

| | Ball of the present invention | | | Conventional wound ball |
|---|---|---|---|---|
| | 80-compression | 90-compression | 100 compression | 90-compression |
| Weight (grams) | 45 | 45 | 45 | 45 |
| Diameter (inches) | 1.680 | 1.680 | 1.680 | 1.680 |
| Rebound (1) (%) | 72 | 70 | 68 | 70 |
| Guillotine cut (No. of drops to failure) | 28 | 23 | 15 | 1 (2) |
| Pneumatic impact (No. of shots to failure) | 35+ | 25–30 | 18–25 | 1 (3) |

(1) Percent rebound means the percentage of the dropped height the ball will rebound when dropped a distance of 10 inches onto a 1 inch thick steel plate.
(2) One drop of the guillotine blade was sufficient to cut the cover of the ball and expose the elastic thread winding.
(3) First impact distorted the conventional ball and caused loss of compression due to breakage of elastic thread windings. Commonly, successive tests caused complete breakage of threads and rupture of ball center. The numbers indicated for the balls of the present invention show the number of tests necessary to break the ball into two pieces. Prior to this breakage, only scuffing and slight loss of compression was evident.

While the present invention relates most particularly to the use of the novel composition of matter as a unitary molded golf ball, other extensive applications may also be mentioned. These include, for example, the manufacture of printing plates, coverings for rolls or the manufacture of rolls per se, protective bumpers, bowling balls, insulators, floor tiles, shoe soles and heels, battery boxes, solid tires and the like. It will be obvious to those skilled in the art that a wide range of applications are possible for the composition of the invention where properties of resilience, toughness and high impact resistance are required.

What we claim is:

1. A composition of matter comprising essentially a cured blend of (1) an elastomer capable of being crosslinked by peroxide-initiated polymerization selected from the group consisting of cis-1,4-polybutadiene, polyisoprene, ethylene propylene non-conjugated diolefin terpolymers, styrene/butadiene rubbers, nitrilebutadiene rubbers and mixtures thereof, (2) an epoxy resin selected from the group consisting of cycloaliphatic epoxy resins, epoxy novolac resins, epichlorohydrin-4,4'-resins and mixtures thereof, (3) an epoxy resin curing agent or hardener selected from citraconic acid, itaconic acid, fumaric acid, maleic acid, maleic anhydride and mixtures thereof, (4) a crosslinking catalyst for said elastomer, and (5) a filler material.

2. A composition of matter as claimed in claim 1 also containing an epoxy resin curing accelerator.

3. A composition of matter as claimed in claim 1 also containing a coloring pigment.

4. A composition of matter as claimed in claim 1 wherein the crosslinking catalyst is of the free radical or peroxide type.

5. A composition of matter as claimed in claim 1 wherein the filler material is selected from the group consisting of silica, clays, carbonates, talc, metal oxides, asbestos, glass, particulate synthetic plastics, particulate carbonaceous materials and mixtures thereof.

6. A composition of matter as claimed in claim 2 wherein the epoxy resin curing accelerator is selected from the group consisting of stannous octoate, dimethylaminomethylphenol, tri(di-methylaminomethyl) phenol, Lewis acids and mixtures thereof.

7. A composition of matter as claimed in claim 1 wherein the epoxy resin curing agent or hardener is selected from fumaric acid, maleic acid, maleic anhydride and mixtures thereof.

8. A unitary molded golf ball of improved cut and impact resistance having a maximum diameter of about 1.69 inches comprising 100 parts by weight of an elastomer capable of being cross-linked by peroxide-initiated polymerization selected from the group consisting of cis-1,4-polybutadiene, polyisoprene, ethylene propylene non-conjugated diolefin terpolymers, styrene/butadiene rubbers, acrylonitrile/butadiene copolymers and mixtures thereof, from about 20 to about 45 parts by weight of an epoxy resin selected from the group consisting of cycloaliphatic epoxy resins, epoxy novolac resins, epichlorohydrin-4,4'-dihydroxydiphenyl-dimethylmethane resins and mixtures thereof, from about 5 to about 20 parts by weight of an epoxy resin curing agent or hardener selected from citraconic acid, itaconic acid, fumaric acid, maleic acid, maleic anhydride and mixtures thereof, from about 20 to about 45 parts by weight of a filler and from about 0.5 to about 5 parts by weight of a cross-linking catalyst for said elastomer.

9. A golf ball as claimed in claim 8 wherein the epoxy resin is a cyclo-aliphatic epoxy resin and the epoxy resin curing agent or hardener is selected from fumaric acid, maleic acid, maleic anhydride and mixtures thereof.

10. A golf ball as claimed in claim 9 also containing from about 0.1 to about 0.5 part by weight of an epoxy resin curing accelerator.

11. A golf ball as claimed in claim 9 also containing from about 0.5 to about 10 parts by weight of a coloring pigment.

12. A golf ball as claimed in claim 9 wherein the crosslinking catalyst is of the free radical or peroxide type.

13. A golf ball as claimed in claim 9 wherein the filler material is selected from the group consisting of silica, clays, carbonates, talc, metal oxides, asbestos, glass, particulate synthetic plastics, particulate carbonaceous materials and mixtures thereof.

14. A golf ball as claimed in claim 13 wherein the epoxy resin curing accelerator is selected from the group consisting of stannous octoate, dimethylaminomethylphenol, tri(dimethylaminomethyl) phenol, Lewis acids and mixtures thereof.

* * * * *